Feb. 22, 1966   J. M. RHOADES   3,236,124
TEMPERATURE COMPENSATION SYSTEM
Filed May 1, 1963
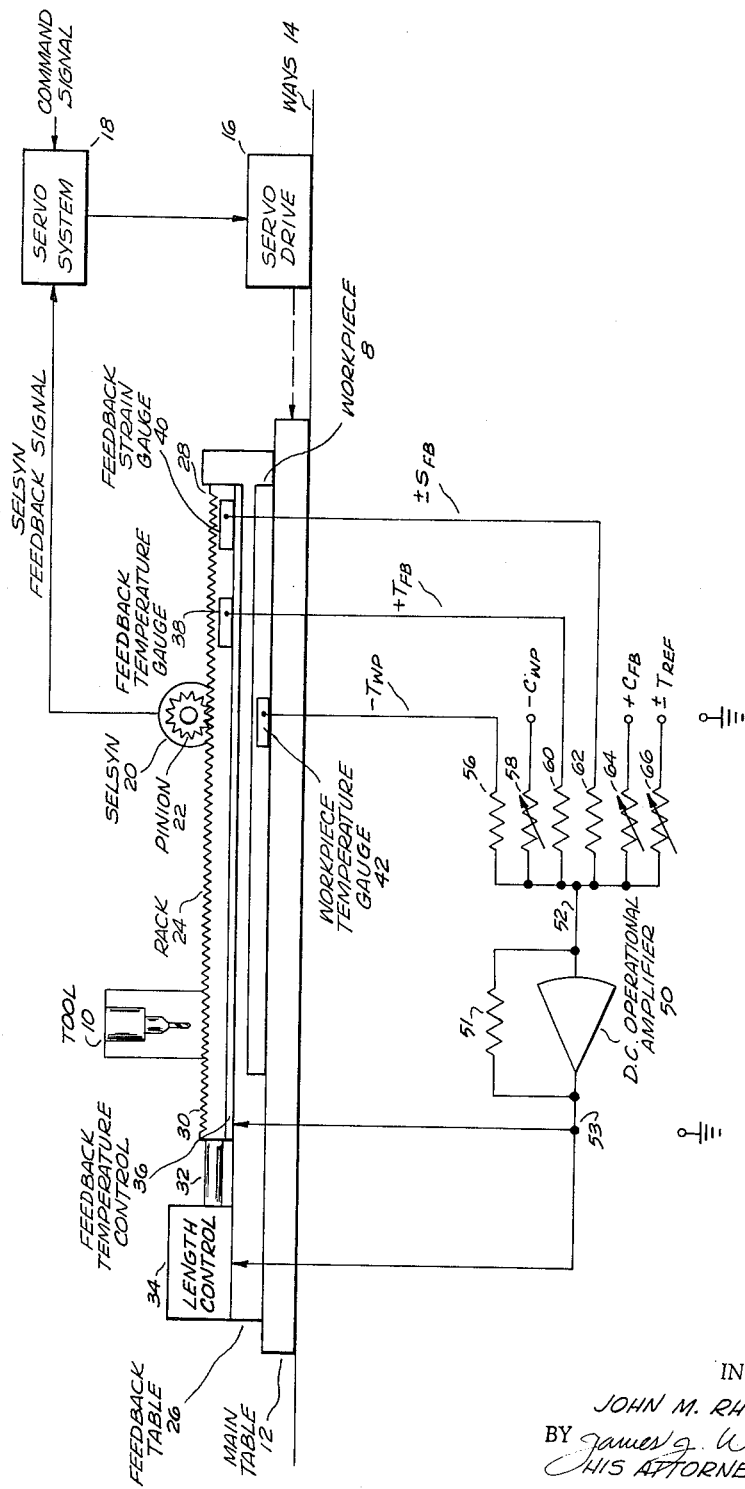
INVENTOR.
JOHN M. RHOADES
BY James J. Williams
HIS ATTORNEY United States Patent Office 3,236,124
Patented Feb. 22, 1966

3,236,124
TEMPERATURE COMPENSATION SYSTEM
John M. Rhoades, Waynesboro, Va., assignor to General Electric Company, a corporation of New York
Filed May 1, 1963, Ser. No. 277,386
12 Claims. (Cl. 77—5)

The invention relates to a temperature compensation system, and particularly to a temperature compensation system for use with numerical control systems utilizing linear feedback devices.

Presently, numerical control systems are used with metal-working or other machines for both positioning and contouring operations. Numerical control systems have been used with various types of metalworking machines to provide accurately dimensioned parts. However, the state of the art has developed to the point where dimensional changes (i.e., expansion or contraction) because of temperature changes limit this accuracy.

Accordingly, an object of the invention is to provide a temperature compensation system for use with a numerical control system utilizing linear feedback devices.

Another object of the invention is to provide a system that compensates for temperature changes of a workpiece, or for temperature changes of a linear feedback device, or for temperature changes of both a workpiece and a linear feedback device.

A temperature compensation system is particularly desirable where the temperature of the workpiece changes, either slowly or rapidly, relative to the temperature of the linear feedback device. For example, a workpiece of aluminum alloy that has a linear coefficient of expansion (hereinafter called coefficient of expansion) of $$12.1 \times 10^{-6}$$

inches per inch per degree Fahrenheit (F.) may, during machining, rise in temperature from 68° F. to 168° F. in a few seconds. This rise in temperature increases the length of 0.00121 inch per inch of length of the workpiece. With present numerical control systems having an accuracy of 0.0001 inch, it will be seen that dimensional changes because of temperature changes are significant.

Accordingly, another object of the invention is to improve the accuracy of existing numerical control systems which utilize linear feedback devices by compensating for temperature changes in the workpiece.

Another object of the invention is to provide a temperature compensation system, for use with numerical control systems utilizing linear feedback devices, that can correct for differences in length of the feedback expansion are combined with signals indicative of the effects.

Briefly, in accordance with the invention, signals indicative of the workpiece temperature and coefficient of expansion are combined with signals indicative of the linear feedback device temperature, coefficient of expansion, and strain. The combined signals are used to control the length of the linear feedback device so that it has the proper length for the temperature of the workpiece. Or, the combined signals may be used to control the length of the workpiece. The length may be controlled by tension or compression, or by heating and cooling, or by both. If heating and cooling only are used, the strain signal is not needed.

The invention is particularly pointed out in the claims. The invention may be better understood from the following description given in connection with the accompanying drawing, in which the single figure shows a preferred embodiment of the temperature compensation system as used with a numerical control system utilizing a linear feedback device.

The numerical control system shown in the drawing is intended to move material, such as a workpiece 8, along an axis relative to a tool 10, which in the drawing is a drill. The workpiece 8 is fastened to a main table 12 which is moved along ways 14 by means of a servo drive 16. The tool 10 is fixed relative to the ways 14, but can be raised and lowered to operate on the workpiece 8. The servo drive 16 moves the main table 12 in response to signals from a servosystem 18. The system 18 compares a command signal indicative of the desired location of the workpiece 8 with a feedback signal indicative of the actual position of the workpiece 8. The feedback signal is provided by a selsyn 20 that is fixed relative to the ways 14. The selsyn 20 is driven by a pinion 22 which engages the teeth of an elongated feedback rack 24. The rack 24 is fastened to a feedback table 26 which is also fastened or mounted on the main table 12. The numerical control system described is known in the art, and moves the main table 12, the workpiece 8, and the other apparatus to the location commanded, and then stops until another location is commanded. A simple numerical control system has been selected for explaining the temperature compensation system of the invention. It is to be understood, however, that the temperature compensation system of the invention may be utilized with other numerical control systems, such as systems which move in two or more axes of direction.

In accordance with the invention, the feedback rack 24 is securely fastened at one end 28 to the feedback table 26, and may lie in suitable grooves on the feedback table 26. The rack 24 moves with the feedback table 26, which in turn moves with the main table 12. The other end 30 of the rack 24 is fastened to a connecting rod 32. The rod 32 is connected to a length control 34 which is securely fastened to the feedback table 26. The length control 34 may be any suitable device, such as a hydraulic or electric motor, which moves the connecting rod 32 back and forth in response to a signal supplied to the length control 34. As will be pointed out, the length control 34 has suffiicent power so that it is able to actually elongate or compress the rack 24 and change its length. Since the rack 24 is actually elongated or compressed, the movable fittings associated with it should have as little play as possible. A feedback temperature control 36 is positioned alongside the rack 24 for the purpose of heating or cooling the rack 24 in accordance with a signal applied to the temperature control 36. As a practical matter, the temperature control 36 can heat the rack 24 more easily than it can cool the rack 24. However, if cooling is desired, the temperature control 36 is intended to provide such cooling in any manner known in the art.

A feedback temperature gauge 38, of any suitable type such as a thermocouple, is coupled to the rack 24. The gauge 38 produces a direct current signal $T_{FB}$ which is preferably positive and which has a magnitude proportional to the temperature of the rack 24. A feedback strain gauge 40 is also coupled to the rack 24. The strain gauge 40 may be any suitable type, such as a complementary strain gauge which is relatively insensitive to strains resulting from temperature changes. Such a gauge is shown in FIG. 6e–22 and described on page 6–55 of "Industrial Electronics Handbook" by Cockrell, First Edition, McGraw-Hill Book Company, Inc., New York, 1958. The strain gauge 40 produces a direct current signal $S_{FB}$ which is preferably positive for tensional strains and negative for compressional strains, and which has a magnitude proportional to the magnitude of strain on the rack 24. A workpiece temperature gauge 42 of any suitable type is coupled to the workpiece 8. The gauge 42 produces a direct current signal $T_{WP}$ which is preferably negative and which has a magnitude proportional to the temperature of the workpiece 8.

A direct current operational amplifier 50 is provided to add algebraically the various signals just described and also additional signals. Such an amplifier is known in the art, a description being found beginning at page 6–123 of the "Industrial Electronics Handbook" mentioned previously. Such amplifiers provide an accurate algebraic addition of direct current analog signals, taking the sign (indicated by positive and negative polarities) into consideration in such additions. The amplifier 50 is provided with input and output buses 52, 53 which may operate relative to a reference potential or ground. A feedback resistor 51 of suitable magnitude is coupled between the input bus 52 and the output bus 53. A plurality of resistors 56, 58, 60, 62, 64, 66 are coupled at one end to the input bus 52. These resistors have suitable magnitudes, some of which are adjustable for reasons that will be explained, which insure that the proper magnitude of signal is applied to the input bus 52 of the amplifier 50. The resistor 56 is coupled to the workpiece temperature gauge 42 for applying the negative workpiece temperature signal indicated as $-T_{WP}$. The resistor 58 is adjustable for applying an adjustable direct current signal which has a magnitude indicative of or proportional to the linear coefficient of expansion of the workpiece. The resistor 58 may be calibrated for this purpose. The signal is preffeedback strain signal indicated as $\pm S_{FB}$. The resistor 60 is coupled to the feedback temperature gauge 38 for applying the positive feedback temperature signal indicated as $+T_{FB}$. The resistor 62 is coupled to the feedback strain gauge 40 for applying the positive (for tensional strains) or negative (for compressional strains) feedback strain signal indicated as $\pm S_{FB}$. The resistor 64 is adjustable for applying an adjustable direct current signal which has a magnitude indicative of or proportional to the linear coefficient of expansion of the feedback rack 24. The resistor 64 may be calibrated for this purpose. This signal is preferably positive and is indicated as $+C_{FB}$. And finally, the resistor 66 is adjustable for applying an adjustable direct current signal which has a magnitude and polarity indicative of any difference in the reference temperatures to which the workpiece 8 and the feedback rack 24 are to be compared. This signal is indicated as $\pm T_{REF}$. If the reference temperatures are the same for the workpiece 8 and the feedback rack 24, then the reference temperature signal $T_{REF}$ is zero.

The various signals are applied through their respective resistors which give the signals the desired weight. As known in the art, the operational amplifier 50 produces an output signal which has a magnitude proportional to the algebraic sum (i.e., the sum taking the positive and negative signs or polarities into consideration) of the magnitudes of the input signals. If the arithmetic sum of the positive input signals exceeds the arithmetic sum of the negative input signals, the operational amplifier 50 produces an output signal which is arbitrarily designated positive and which has a magnitude proportional to the excess. But if the arithmetic sum of the negative input signals exceeds the arithmetic sum of the positive input signals, then the operational amplifier 50 produces an output signal which is arbitrarily designated negative, and which has a magnitude proportional to the excess. If the magnitude of the positive input signals equals the magnitude of the negative input signals, then the amplified 50 produces an output signal of zero. These output signals are supplied to the length control 34 and to the feedback temperature control 36. The length control 34 compresses the rack 24 and the temperature control 36 cools the rack 24 in response to positive output signals. And, the length control 34 elongates the rack 24 and the temperature control 36 heats the rack 24 in response to negative output signals.

The operation of the temperature compensation system of the invention may be summarized by the following expression:

$$(T_{FB}-T_{REF})C_{FB} \pm S_{FB} = (T_{WP}-T_{REF})C_{WP}$$

In accordance with the invention, the feedback rack 24 changes its length (by some amount in inches per inch) so that the tool operation on the workpiece 8 will be at the desired point when the workpiece 8 is at some reference temperature. Without such compensation, the feedback rack 24 would indicate an improper or inaccurate position. The following example may assist in understanding the operation of the system. Assume that the workpiece temperature signal $T_{WP}$ is $-10$ volts, that the workpiece coefficient of expansion signal $C_{WP}$ is $-12$ volts, that the feedback temperature signal $T_{FB}$ is $+8$ volts, that the feedback coefficient of expansion signal $C_{FB}$ is $+5$ volts, that the reference temperature signal $T_{REF}$ is 0, and that the strain signal $S_{FB}$ is 0. These signals provide a total of $-22$ volts and $+13$ volts so that the amplifier 50 produces an output signal of $-9$ volts. This negative output signal causes the length contron 34 to elongate the feedback rack 24 and thereby introduce an increasing positive strain signal $S_{FB}$. This negative output signal also causes the temperature control 36 to heat the rack 24 and thereby increase the magnitude of the feedback temperature signal $T_{FB}$ in the positive direction. The combination of the increasing positive strain signal $S_{FB}$ and the increasing positive feedback temperature signal $T_{FB}$ with the coefficient of expansion signal $C_{FB}$ will, in some time, produce a total of $+22$ volts. At this point, the operational amplifier 50 will produce an output signal of 0, and no further heating or elongation is called for. The system remains in this condition until one of the variables changes, such a change resulting in some action by the operational amplifier 50, either more elongation and heating, or less elongation and cooling.

It will be understood that the signs or polarities selected for the various signals are arbritary. But, it is desirably, if not necessary, that the signals assoicated with the workpiece have the opposite polarity with respect to the signals associated with the feedback device, and that a tension strain signal have the same polarity as signals associated with the feedback device and a compression strain signal have the same polarity as signals associated with the workpiece.

Although the feedback device is provided with a temperature gauge 38 and a strain gauge 40, and although the operational amplifier 50 controls the length control 34 and the temperature control 36, it will be understood that all of these elements are not necessary. For example, if the length control 34 is removed and only the temperature control 36 is utilized for the feedback rack 24, the strain gauge 40 is not necessary. And, if the temperature control 36 is removed, and only the length control 34 is utilized for the feedback rack 24, the temperature gauge 38 is not necessary. However, if the length control 34 is used, the strain gauge 40 is necessary or at least desirable so that the compensation system has a closed loop. Likewise, if the temperature control 36 is used, the temperature gauge 38 is necessary or at least desirable to also provide a closed loop. It also might be mentioned that the ratio of the signals supplied to the length control 34 and the feedback temperature control 36 may be varied relative to each other. For example, the length control 34 may be a relatively low gain system and the temperature control 36 a relatively high gain system. Under such a condition, the length control 34 is operated only as long as considerable corrections are called for. Once the feedback device has the desired length, the length control 34, because of its reduced gain, may be bypassed. Only minor corrections are necessary and can be provided by the temperature control 36. Also, other circuits or arrangements can be used in place of the operational amplifier 50 to provide the summing or addition of the various signals. However, these are alternatives, and may or may not be desirable in certain applications.

The following example will indicate the practicality of the temperature compensation system. Assume that a workpiece of aluminum alloy, having a length of 100 inches and a linear coefficient of expansion of $12.1 \times 10^{-6}$ inches/inch/° F. is to be machined. Also assume that during machining, the temperature of the workpiece increases from the reference temperature of 68° F. by 100° F. to a temperature of 168° F. Further assume that the feedback rack has a length of 100 inches and is made of a stainless steel alloy having a linear coefficient of expansion of $5.5 \times 10^{-6}$ inches/inch/° F. With the workpiece at its increased temperature, it will have an added length of 100 inches $\times 100°$ F. $\times 12.1 \times 10^{-6}$ inches/inch/ ° F., or 0.121 inch. If the feedback rack is to be compensated by temperature alone, then its temperature must be increased $$\frac{0.121 \text{ inch}}{100 \text{ inches} \times 5.5 \times 10^{-6} \text{ inches/inch/°F}}$$

or 220° F. With respect to the reference temperature, this is a temperature of 288° F. This amount of heat may be undesirable or impractical in some applications. In such cases, the feedback rack may be elongated.

Assume that during the machining process the feedback rack rises 7° F. to a temperature of 75°F. This provides an additional length of $100 \times 7°F. \times 5.5 \times 10^{-6}$ inch/inch/°F., or 0.00385 inch. Thus the needed additional length or elongation S is 0.121−0.00385, or 0.11715 inch. Assume that the feedback rack has an area A of one square inch and a modulus of elasticity M of $28 \times 10^6$ pounds/square inch. The force required to produce the additional length of 0.11715 inch equals $$\frac{M \times S \times A}{L}$$

which equals $$\frac{28 \times 10^6 \times 0.11715 \times 1}{100}$$

or 32,900 pounds. This is not an unusual or difficult force to attain. If the maximum elongation or compression which the system can be expected to provide is 0.2 inch, and if it is necessary that this elongation or compression be achieved in 0.1 second, then the work required is equal to $$\frac{1}{2} \times \frac{32,900 \text{ pounds} \times 0.2 \text{ inch} \times 1/12\text{th foot/inch}}{0.1 \text{ second}}$$

or 2,740 foot-pounds/second. This amount of work can be achieved with a length control motor of 5 horsepower which is a reasonable size. Actually, the horsepower could be reduced considerably by allowing more time for the elongation or compression. A time of 0.1 second is relatively short, and could be longer in most machining applications.

The temperature compensation system of the invention can be used in many applications, and can be used with controls in one, two, or more axes of directions by providing sufficient additional equipment. The temperature compensation system can use either heating or cooling or can use elongation or compression, or can use a combination of heating, cooling, elongation, and compression. Further, the temperature compensation system can operate on feedback devices such as shown or on other types of linear feedback devices. And, in some applications, the system can operate on the workpiece. However, it is preferred to operate on the feedback device, since the feedback device may be permanently set up whereas the workpiece is always being changed. And, the temperature compensation system may be utilized with any desired reference temperature, or can be used with different reference temperatures for the feedback device and for the workpiece. In any case, it will be seen that the temperature compensation system improves the accuracy in a practical manner. Therefore, while the invention has been described with reference to a particular embodiment, it is to be understood that modifications may be made without departing from the spirit of the invention or from the scope of the claims.

What I claim as new and desire to secure by Letters Patent of the United States is:

1. In an arrangement wherein a first object and a second object are moved relative to each other in response to signals produced by a position indicating device having a first portion and a second portion respectively associated with said first object and said second object, a temperature compensation system comprising first means for producing a first signal indicative of the temperature of said first object, second means for producing a second signal indicative of the coefficient of expansion of said first object, third means for producing a third signal indicative of the strain on one of said first and second portions of said position indicating device, means coupled to said first, second, and third means for producing a control signal having one characteristic responsive to said first and second signals and having a second opposite characteristic responsive to said third signal, length control means adapted to be coupled to said one portion of said position indicating device, and means coupling said control signal producing means to said length control means for applying said control signal thereto.

2. In an arrangement wherein a first object and a second object are moved relative to each other in response to signals produced by a position indicating device having a first portion and a second portion respectively associated with said first object and said second object, a temperature compensation system comprising first means for producing a first signal indicative of the temperature of said first object, second means for producing a second signal indicative of the coefficient of expansion of said first object, third means for producing a third signal indicative of the temperature of one of said first and second portions of said position indicating device, means coupled to said first, second, and third means for producing a control signal having one characteristic responsive to said first and second signals and having a second opposite characteristic responsive to said third signal, temperature control means adapted to be coupled to said one portion of said position indicating device, and means coupling said control signal producing means to said temperature control means for applying said control signal thereto.

3. In an arrangement wherein a first object and a second object are moved relative to each other in response to signals produced by a position indicating device having a first portion and a second portion respectively associated with said first object and said second object, a temperature compensation system comprising first means for producing a first signal indicative of the temperature of said first object, second means for producing a second signal indicative of the coefficient of expansion of said first object, third means for producing a third signal indicative of the temperature of one of said first and second portions of said position indicating device, fourth means for producing a fourth signal indicative of the coefficient of expansion of said one portion of said position indicating device, means coupled to said first, second, third, and fourth means for producing a control signal having a characteristic which varies directly with said first and second signals and which varies inversely with said third and fourth signals, temperature control means adapted to be coupled to said one portion of said position indicating device, and means coupling said control signal producing means to said temperature control means for applying said control signal thereto.

4. In an arrangement wherein a first object and a second object are moved relative to each other in response to signals produced by a position indicating device having a first portion and a second portion respectively associated with said first object and said second object, a temperature compensation system comprising first means for producing a first signal indicative of the temperature of said first object, second means for producing a second signal indicative of the coefficient of expansion of said first object, third means for producing a third signal indicative of the temperature of one of said first and second portions of said position indicating device, fourth means for producing a fourth signal indicative of the coefficient of expansion of said one portion of said position indicating device, means coupled to said first, second, third, and fourth means for producing a control signal having a characteristic determined by the polarity of the algebraic sum of said first, second, third, and fourth signals, temperature control means adapted to be coupled to said one portion of said position indicating device, and means coupling said control signal producing means to said temperature control means for applying said control signal thereto.

5. In an arrangement wherein a first object and a second object are moved relative to each other in response to signals produced by a position indicating device having a first portion and a second portion respectively associated with said first object and said second object, a temperature compensation system comprising first means for producing a first signal indicative of the temperature of said first object, second means for producing a second signal indicative of the coefficient of expansion of said first object, third means for producing a third signal indicative of the temperature of one of said first and second portions of said position indicating device, fourth means for producing a fourth signal indicative of the coefficient of expansion of said one portion of said position indicating device, fifth means for producing a fifth signal indicative of the strain on said one portion of said position indicating device, means coupled to said first, second, third, fourth, and fifth means for producing a control signal having a characteristic determined by the magnitude of said first and second signals relative to said third, fourth, and fifth signals, length control means adapted to be coupled to said one portion of said position indicating device, and means coupling said control signal producing means to said length control means for applying said control signal thereto.

6. In an arrangement wherein a first object and a second object are moved relative to each other in response to signals produced by a position indicating device having a first portion and a second portion respectively associated with said first object and said second object, a temperature compensation system comprising first means for producing a first polarity signal that is proportional to the temperature of said first object and to the coefficient of expansion of said first object, second means for producing a second and opposite polarity signal that is proportional to the temperature of one of said first and second portions of said position indicating device and to the coefficient of expansion of said one portion of said position indicating device, third means for producing a third signal that is proportional to the strain on said one portion of said position indicating device and that has a polarity determined by the characteristic of said strain, means coupled to said first, second, and third means for producing a control signal having a characteristic determined by the polarity of the algebraic sum of said first, second, and third signals, length control means adapted to be coupled to said one portion of said position indicating device, and means coupling said control signal producing means to said length control means for applying said control signal thereto.

7. In an arrangement wherein a first object and a second object are moved relative to each other in response to signals produced by a position indicating device having a first portion and a second portion respectively associated with said first object and said second object, a temperature compensation system comprising first means for producing a first polarity signal that is proportional to the temperature of said first object and to the coefficient of expansion of said first object, second means for producing a second and opposite polarity signal that is proportional to the temperature of one of said first and second portions of said position indicating device and to the coefficient of expansion of said one portion of said position indicating device, third means for producing a third signal that is proportional to the strain on said one portion of said position indicating device and that has a polarity determined by the characteristic of said strain, means coupled to said first, second, and third means for producing a control signal having a characteristic determined by the polarity of the algebraic sum of said first, second, and third signals, length and temperature control means adapted to be coupled to said one portion of said position indicating device, and means coupling said control signal producing means to said length and temperature control means for applying said control signal thereto.

8. In an arrangement wherein a first object and a second object are moved relative to each other in response to signals produced by a position indicating device having a first portion and a second portion respectively associated with said first object and said second object, a temperature compensation system comprising first means for producing a first signal indicative of the temperature of said first object, second means for producing a second signal indicative of the coefficient of expansion of said first object, third means for producing a third signal indicative of the temperature of one of said first and second portions of said position indicating device, fourth means for producing a fourth signal indicative of the coefficient of expansion of said one portion of said position indicating device, means coupled to said first, second, third, and fourth means for producing a control signal having a characteristic which varies directly with said first and second signals and which varies inversely with said third and fourth signals, temperature control means adapted to be coupled to said first object, and means coupling said control signal producing means to said temperature control means for applying said control signal thereto.

9. In an arrangement wherein a first object and a second object are moved relative to each other in response to signals produced by a position indicating device having a first portion and a second portion respectively associated with said first object and said second object, a temperature compensation system comprising first means for producing a first signal indicative of the temperature of said first object, second means for producing a second signal indicative of the coefficient of expansion of said first object, third means for producing a third signal indicative of the temperature of one of said first and second portions of said position indicating device, fourth means for producing a fourth signal indicative of the coefficient of expansion of said one portion of said position indicating device, means coupled to said first, second, third, and fourth means for producing a control signal having a characteristic determined by the polarity of the algebraic sum of said first, second, third, and fourth signals, temperature control means adapted to be coupled to said first object, and means coupling said control signal producing means to said temperature control means for applying said control signal thereto.

10. In an arrangement wherein a first object and a second object are moved relative to each other in response to signals produced by a position indicating device having a first portion and a second portion respectively associated with said first object and said second object, a temperature compensation system comprising first means for producing a first signal indicative of the temperature of said first object, second means for producing a second signal indicative of the coefficient of expansion of said first object, third means for producing a third signal indicative of the strain on said first object, fourth means for producing a fourth signal indicative of the temeprature of one of said first and second portions of said position indicating device, fifth means for producing a fifth signal indicative of the coefficient of expansion of said one portion of said position indicating device, means coupled to said first, second, third, fourth, and fifth means for producing a control signal having a characteristic determined by the magnitude of said first, second, and third signals relative to said fourth and fifth signals, length control means adapted to be coupled to said first object, and means coupling said control signal producing means to said length control means for applying said control signal thereto.

11. In an arrangement wherein a first object and a second object are moved relative to each other in response to signals produced by a position indicating device having a first portion and a second portion respectively associated with said first object and said second object, a temperature compensation system comprising first means for producing a first polarity signal that is proportional to the temperature of said first object and to the coefficient of expansion of said first object, second means for producing a second signal that is proportional to the strain on said first object and that has a polarity determined by the characteristic of said strain, third means for producing a third signal of opposite polarity that is proportional to the temperature of one of said first and second portions of said position indicating device and to the coefficient of expansion of said one portion of said position indicating device, means coupled to said first, second, and third means for producing a control signal having a characteristic determined by the polarity of the algebraic sum of said first, second, and third signals, length control means adapted to be coupled to said first object, and means coupling said control signal producing means to said length control means for applying said control signal thereto.

12. In an arrangement wherein a first object and a second object are moved relative to each other in response to signals produced by a position indicating device having a first portion and a second portion respectively associated with said first object and said second object, a temperature compensation system comprising first means for producing a first polarity signal that is proportional to the temperature of said first object and to the coefficient of expansion of said first object, second means for producing a second signal that is proportional to the strain on said first object and that has a polarity determined by the characteristic of said strain, third means for producing a third signal of opposite polarity that is proportional to the temperature of one of said first and second portions of said position indicating device and to the coefficient of expansion of said one portion of said position indicating device, means coupled to said first, second, and third means for producing a control signal having a characteristic determined by the polarity of the algebraic sum of said first, second, and third signals, length and temperature control means adapted to be coupled to said first object, and means coupling said control signal producing means to said length and temperature control means for applying said control signal thereto.

References Cited by the Examiner

UNITED STATES PATENTS 3,142,120   7/1964   Mottu _____ 33—125

WILLIAM W. DYER, JR., *Primary Examiner.*

FRANCIS S. HUSAR, *Examiner.*